(12) United States Patent
Rossi et al.

(10) Patent No.: US 7,778,737 B2
(45) Date of Patent: Aug. 17, 2010

(54) METHOD AND SYSTEM FOR LOCAL LOAD CONTROL

(75) Inventors: John F. Rossi, Mendham, NJ (US); Howard Ng, Towaco, NJ (US)

(73) Assignee: Comverge, Inc., Norcross, GA (US)

( * ) Notice: Subject to any disclaimer, the term of this patent is extended or adjusted under 35 U.S.C. 154(b) by 264 days.

(21) Appl. No.: 11/470,549

(22) Filed: Sep. 6, 2006

(65) Prior Publication Data

US 2007/0129851 A1    Jun. 7, 2007

Related U.S. Application Data

(60) Provisional application No. 60/714,801, filed on Sep. 7, 2005.

(51) Int. Cl.
*G05D 3/12* (2006.01)
*G05D 9/00* (2006.01)
*G05D 5/00* (2006.01)

(52) U.S. Cl. .............. 700/295; 700/276; 700/278; 700/286

(58) Field of Classification Search .......... 700/276, 700/278, 286, 295
See application file for complete search history.

(56) References Cited

U.S. PATENT DOCUMENTS

| | | | |
|---|---|---|---|
| 4,298,935 A | 11/1981 | Lange et al. | |
| 4,337,401 A | 6/1982 | Olson | |
| 4,347,974 A | 9/1982 | Pinckaers et al. | |
| 4,387,763 A | 6/1983 | Benton | |
| 4,389,577 A | 6/1983 | Anderson et al. | |
| 4,413,250 A | 11/1983 | Porter et al. | |
| 4,435,162 A | 3/1984 | Schoenwald | |
| 4,583,182 A | 4/1986 | Breddan | |
| 4,616,325 A | 10/1986 | Heckenbach et al. | |
| 4,633,217 A | 12/1986 | Akano | |
| 4,742,475 A | 5/1988 | Kaiser et al. | |
| 4,753,388 A | 6/1988 | Rummage | |
| 4,776,514 A | 10/1988 | Johnstone et al. | |
| 4,889,179 A | 12/1989 | Merenda | |
| 5,133,302 A | 7/1992 | Yamada et al. | |
| 5,289,362 A | 2/1994 | Liebl et al. | |
| 5,598,349 A | 1/1997 | Elliason et al. | |
| 5,635,896 A | 6/1997 | Tinsley et al. | |
| 5,644,173 A | 7/1997 | Elliason et al. | |
| 5,731,965 A * | 3/1998 | Cheng et al. | ............. 363/41 |

(Continued)

FOREIGN PATENT DOCUMENTS

JP    2003/0262387    9/2003

(Continued)

*Primary Examiner*—Michael D Masinick
(74) *Attorney, Agent, or Firm*—Philip H. Burrus, IV

(57) ABSTRACT

A method and system for shedding loads based upon a power system characteristic, such as voltage or frequency, is provided. In one embodiment, a remote party, such as a power generator or utility, transmits a signal to a control device proximately located with a load device. Upon receipt of the signal, the control device measures the power system characteristic for a predetermined time to establish a baseline threshold. The control device then monitors the power system characteristic. When the power system characteristic falls outside the baseline threshold, the control device sheds load. In one embodiment, the loads are prioritized such that the load of least importance may be shed first.

16 Claims, 3 Drawing Sheets

U.S. PATENT DOCUMENTS

| | | |
|---|---|---|
| 5,761,083 A | 6/1998 | Brown, Jr. et al. |
| 5,816,491 A | 10/1998 | Berkeley et al. |
| 5,926,776 A | 7/1999 | Glorioso et al. |
| 6,108,614 A | 8/2000 | Lincoln et al. |
| 6,212,894 B1 | 4/2001 | Brown et al. |
| 6,254,009 B1 | 7/2001 | Proffitt et al. |
| 6,798,341 B1 | 9/2001 | Eckel et al. |
| 6,305,611 B1 | 10/2001 | Proffitt et al. |
| 6,307,464 B1 | 10/2001 | Miller et al. |
| 6,320,494 B1 | 11/2001 | Bartles et al. |
| 6,499,533 B2 | 9/2002 | Mueller et al. |
| 6,478,084 B1 | 11/2002 | Kumar et al. |
| 6,480,803 B1 | 11/2002 | Pierret et al. |
| 6,493,644 B1 * | 12/2002 | Jonker et al. .................. 702/61 |
| 6,574,581 B1 | 6/2003 | Bohrer et al. |
| 6,608,900 B1 | 8/2003 | Vancey et al. |
| 6,615,147 B1 * | 9/2003 | Jonker et al. .................. 702/61 |
| 6,619,555 B2 | 9/2003 | Rosen |
| 6,622,097 B2 | 9/2003 | Hunter |
| 6,622,926 B1 | 9/2003 | Sartain et al. |
| 6,634,566 B2 | 10/2003 | Archacki, Jr. et al. |
| 6,643,566 B1 | 11/2003 | Lehr et al. |
| 6,643,567 B2 | 11/2003 | Kold et al. |
| 6,690,939 B1 | 2/2004 | Jonsson et al. |
| 6,718,213 B1 | 4/2004 | Enberg |
| 6,822,555 B2 | 11/2004 | Mansfield, Jr. et al. |
| 6,956,463 B2 | 10/2005 | Crenella et al. |
| 7,062,361 B1 | 6/2006 | Lane |
| 7,130,719 B2 * | 10/2006 | Ehlers et al. ................. 700/276 |
| 7,163,158 B2 | 1/2007 | Rossi et al. |
| 2003/0014200 A1 * | 1/2003 | Jonker et al. .................. 702/60 |
| 2003/0187549 A1 | 10/2003 | Bohrer et al. |
| 2005/0188706 A1 | 9/2005 | Tokushige et al. |
| 2006/0036350 A1 | 2/2006 | Bohrer et al. |
| 2007/0146958 A1 * | 6/2007 | Babcock et al. ............. 361/160 |

FOREIGN PATENT DOCUMENTS

| | | |
|---|---|---|
| JP | 2003262387 A | 9/2003 |

* cited by examiner

METHOD AND SYSTEM FOR LOCAL LOAD CONTROL

CROSS REFERENCE TO PRIOR APPLICATIONS

This application claims priority and benefit under 35 U.S.C. §119(e) from U.S. Provisional Application No. 60/714,801, filed Sep. 7, 2005, which is incorporated by reference for all purposes.

BACKGROUND

1. Technical Field

This invention relates generally to load control systems, and more specifically to a method and apparatus for reducing an operating time of a load, such as an air compressor or furnace, when a source voltage falls below a base line established during a predetermined time.

2. Background Art

As utilities have become deregulated, the infrastructure for generating and delivering energy has become more complex. A generator produces energy and delivers it to s transmission grid. The owner of the transmission grid then "wheels" the energy to a distribution network. The owner of the distribution network then delivers it to an end user. The generator then bills the end user. The generator then pays the transmission grid owner and distribution network owner from the funds collected.

A problem with this multi-party network is that the various components may not be perfectly in sync at all times. During extremely hot or extremely cold weather, for example, consumers may demand unusually large amounts of energy for heating or cooling. It is possible that either the generator will not be able to produce sufficient energy, or that the transmission or distribution network will not be able to accommodate sufficient energy.

What is needed is a way for a remote party, such as a generator or distributor, to monitor characteristics of energy delivered to end consumers, and where problems arise, to be able to shed loads.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
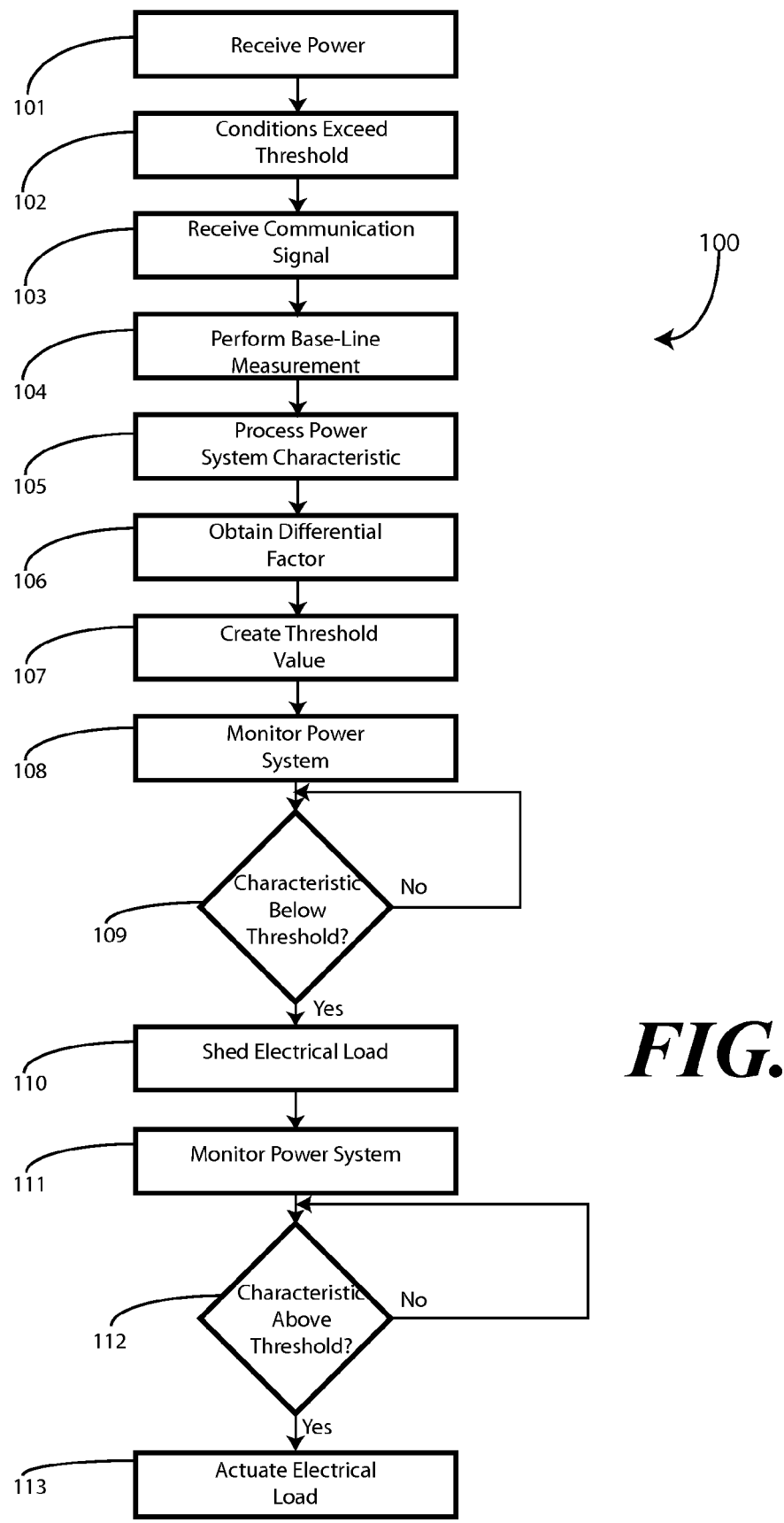
FIG. 1 illustrates one embodiment of a method in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to control a load device when a source voltage falls below a baseline established at a predetermined time. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of load control as described herein. The non-processor circuits may include, but are not limited to, a radio receiver, a radio transmitter, signal drivers, clock circuits, power source circuits, and user input devices. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

Turning to FIG. 1, illustrated herein is one embodiment of a method 100 of controlling an electrical load. Initially, as shown in step 101, an electrical service provider supplies the electrical load with power. At step 102, the electrical load receives a communication signal from the electrical service provider when system operating conditions exceed at least one predetermined criterion. The communication signal may comprise a one-way communication signal that is delivered from the electrical service provider to a control unit. In one embodiment, the predetermined criterion comprises line losses of an electrical distribution network coupled to the electrical load. In a further embodiment of method 100, the predetermined criterion comprises ambient temperature. In another embodiment, the predetermined criterion is where operating conditions are most vulnerable as determined by the electrical service provider.

By way of an example, on a hot day the power consumption may increase by to excessive use of air conditioners to cool homes. This power consumption may put a strain on the electrical service provider and/or the transmission and distribution networks. In such a scenario, a regulation of power consumption may need to be administered. The electrical service provider may analyze ambient temperature, line losses, line capacities, and other associated power demand to may create a predetermined criterion based on the data. The predetermined criterion in this embodiment may be a specific temperature where once the temperature is exceeded power demand may increase above desired levels, forcing power regulation.

At step 103, the electrical load, or a control device coupled thereto, receives the communication signal having measurement indicia. The measurement indicia may comprise an indication to begin a base-line measurement of a power system characteristic. The power system characteristic may comprise, but is not limited to, line voltage or frequency. These power system characteristics may be used to characterize the power usage of the electrical load.

Using least one power system characteristic as may be obtained in step 103, a base line measurement is performed at step 104. In one embodiment, the step of performing the base line measurement includes measuring the power system characteristic for at least a predetermined time. The base line measurement occurs proximately with the electrical load. By way of an example, a base line measurement where the power system characteristic is voltage occurring proximately with the electrical load, may be a measurement of the output voltage received from a transmission or distribution network by a local electrical load.

The base line measurement may be taken over a predetermined time period. In one embodiment, the time period may be a single time interval. In another embodiment, the step of performing the base line measurement may occur by measuring the power system characteristic for at least the predetermined time by taking at least a plurality of measurements of the power system characteristic. This plurality of measurements may be integrated or averaged. For example, the base line measurement of a voltage characteristic may be the average of a series of single voltage measurements taken over a long period of time. In contract, in one embodiment, the base line measurement of a voltage characteristic may be the average of continuous voltage measurements over a short period of time.

At step 105, the power system characteristic is processed across the predetermined time to obtain a processed base-line measurement. A differential factor is then retrieved or received at step 106. The differential factor may be retrieved from a memory within a control unit coupled to the local electrical load. In one embodiment, the differential factor is received along with the based line measurement initiation signal in the communication signal sent from the electrical service provider.

The differential factor is then used to reduce the processed base line measurement to obtain a threshold value at step 107. In one embodiment, the step of reducing the processed base line measurement by the differential factor comprises multiplying the processed base-line measurement by the differential factor. Another embodiment of reducing the processed base-line measurement by the differential factor may comprise subtracting the differential factor from the processed base-line measurement.

At step 108 the power system characteristic is monitored. The power system characteristic may then be compared to the threshold value. At decision 109, a power characteristic is compared with the threshold value. Where the power system characteristic falls below the threshold value, at least one local electrical load is shed at step 110. If the power system characteristic does not fall below the threshold value the power system characteristic may continue to be monitored.

In one embodiment, the step of shedding the at least one local electrical load may further comprise determining a prioritization of a plurality of loads, and removing the load having a highest priority. For example, the plurality of loads may include high to low power consumption devices, wherein the high power consumption devices have the highest priority. By shedding a local electrical load with a highest priority, the most power will be saved.

In another embodiment of the step of shedding the at least one local electrical load may comprise determining a prioritization of a plurality of loads, and removing the load having the lowest priority. By way of an example, priority is determined by need of the load. In a hospital environment, a high priority load may include life a support systems while a low priority load may include a vending machine. In the case a local electrical node is shed, the loads that will cause the least disturbances to the local environment will be shed.

In one embodiment, following the shedding of a local electrical load, the power system characteristic is monitored again at step 111. At decision 112, the power system characteristic compared to the threshold value. If the power system characteristic is greater than the threshold value, the at least on local electrical load is actuated at step 113. Allowing the actuating of shed local electrical loads may allow a dynamic system for shedding and actuating local electrical loads based on power demands.

In one embodiment, when the power system characteristic exceeds the threshold value by at least a predetermined restart value, the at least one local electrical load is actuated. In another embodiment of actuating additional loads following the shedding of a local electrical load, the at least one local electrical load is actuated when the power system characteristic exceeds the threshold value for at least a predetermined restart time. The hysteresis of these embodiments may eliminate variant fluctuations of the power system characteristic and may only allow actuation of a local electrical load when the power system characteristic consistently remains above the threshold value.

Figure 2:
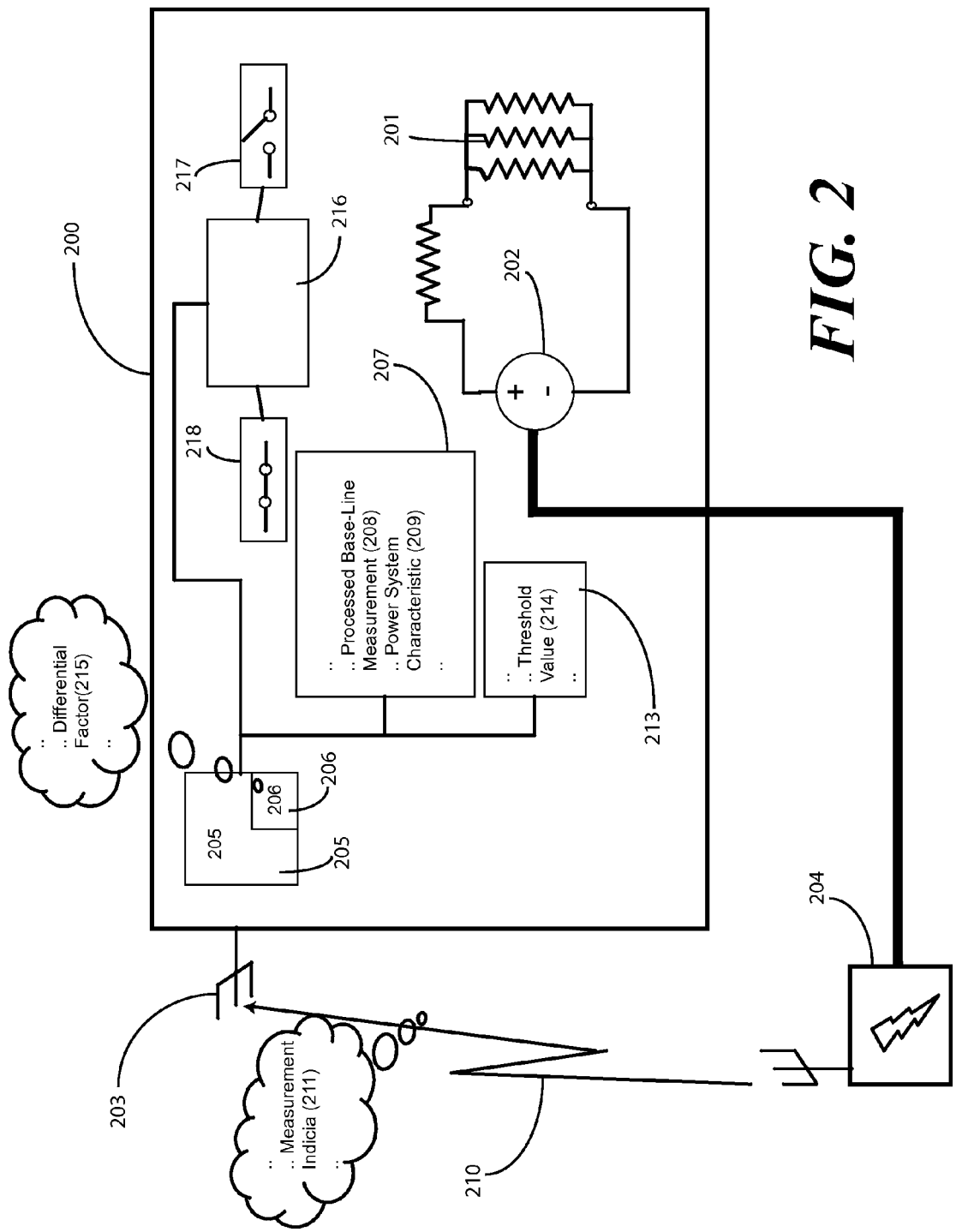
FIG. 2 illustrates one embodiment of a system in accordance with the invention.

Turning now to FIG. 2, illustrated therein is one embodiment of a load controlling device 200 disposed proximately with an electrical load 201. The load controlling device 200 comprises a receiver 203. In one embodiment the receiver 203 is in communication with an electrical services provider 204. The electrical services provider 204 may provide electrical power to the electrical load 201. To those familiar in the arts of electrical power, the electrical service provider 204 may be in the form of a voltage source 202 as seen by the electrical load. The receiver 203 is coupled to a controller 205. The controller 205 may further comprise a memory 206.

In one embodiment, a power system characteristic measurement module 207 may be operable with the controller 205. The power system characteristic measurement module 207 may be configured to establish a processed base-line measurement 208 of a power system characteristic 209 in response to the receiver 203 receiving a communication signal 210. Those familiar in the arts will recognize that the communication signal 210 may be sent over one other following technologies, but is not limited to satellite communication, WANs, WiFi Networks, and other similar networks.

The electrical services provider 204 may generate the communication signal 210 upon a predetermined threshold being exceeded. In one embodiment, the predetermined threshold being exceeded comprises load losses of a power distribution grid 211 exceeding one of a predetermined load loss threshold. A further embodiment of the predetermined threshold being exceeded may include an ambient temperature exceeding a predetermined threshold.

The communication signal 210 may comprise measurement indicia 211 therein. The measurement indicia 211 may comprise, but is not limited to the power system characteristic. The power system characteristic 209 may comprise, but is not limited to, line voltage or frequency. The power system characteristic 209 may be used to characterize the power usage of the electrical load 201.

In one embodiment, a threshold module 213 is operable with the controller 205. The threshold module 213 may be configured to determine a threshold value 214 by retrieving from memory or receiving from a receiver a differential factor 215. The differential factor 205 may be retrieved from within the load controlling device 200, perhaps from a non-volatile memory device. In one embodiment, the differential factor 215 is received along with the measurement indicia 211 in the communication signal sent from the electrical service provider 204.

The differential factor 215 may be used to reduce the processed base-line measurement 208. In one embodiment, the differential factor 215 reduces the processed base-line measurement 208 by multiplying the processed base-line measurement 208 by the differential factor 215. Another embodiment of reducing the processed base-line measurement 208 by the differential factor 215 may comprise subtracting the differential factor 215 from the processed base-line measurement 208.

In one embodiment, the controller 205 is coupled to a comparison module 216. The comparison module 216 may be configured to monitor the power system characteristic 207. The comparison module 216 may further be used to determine when the power system characteristic 207 falls below the threshold value 214. A load shedding module 217 is operable with the comparison module 216. In one embodiment the load shedding module 217 is configured to decouple power to at least the electrical load 201. Power is decoupled from the electrical load 201 when the comparator module 216 indicates that the power system characteristic 209 has fallen below the threshold value 214.

By way of example, the power system characteristic 209 is the output voltage dropped over the electrical load. The power system characteristic 209 is sent to the characteristic measurement module where a processed base-line measurement of the output voltage is established. The processed base-line measurement of the output voltage is next subtracted by the differential factor 215 to create an output voltage threshold value. The comparison module 216 monitors the output voltage to determine if it drops over the output voltage threshold.

In one embodiment, the load controlling device 200 comprises a restart module 218. The restart module 218 is connected to the comparison module 216. The restart module 218 may be configured to recouple power to the at least one electrical load 210. Power may be recoupled to at least one electrical load 201 when the comparator module 216 indicates that the power system characteristic 209 exceeds the threshold value 214.

In one embodiment, when the power system characteristic 209 exceeds the threshold value 214 by at least a predetermined amount, the at least one electrical load 201 is actuated. In another embodiment of actuating additional loads following the shedding of a local electrical load, the at least one electrical load is actuated when the power system characteristic 209 exceeds the threshold value 214 for at least a predetermined restart time.

Figure 3:
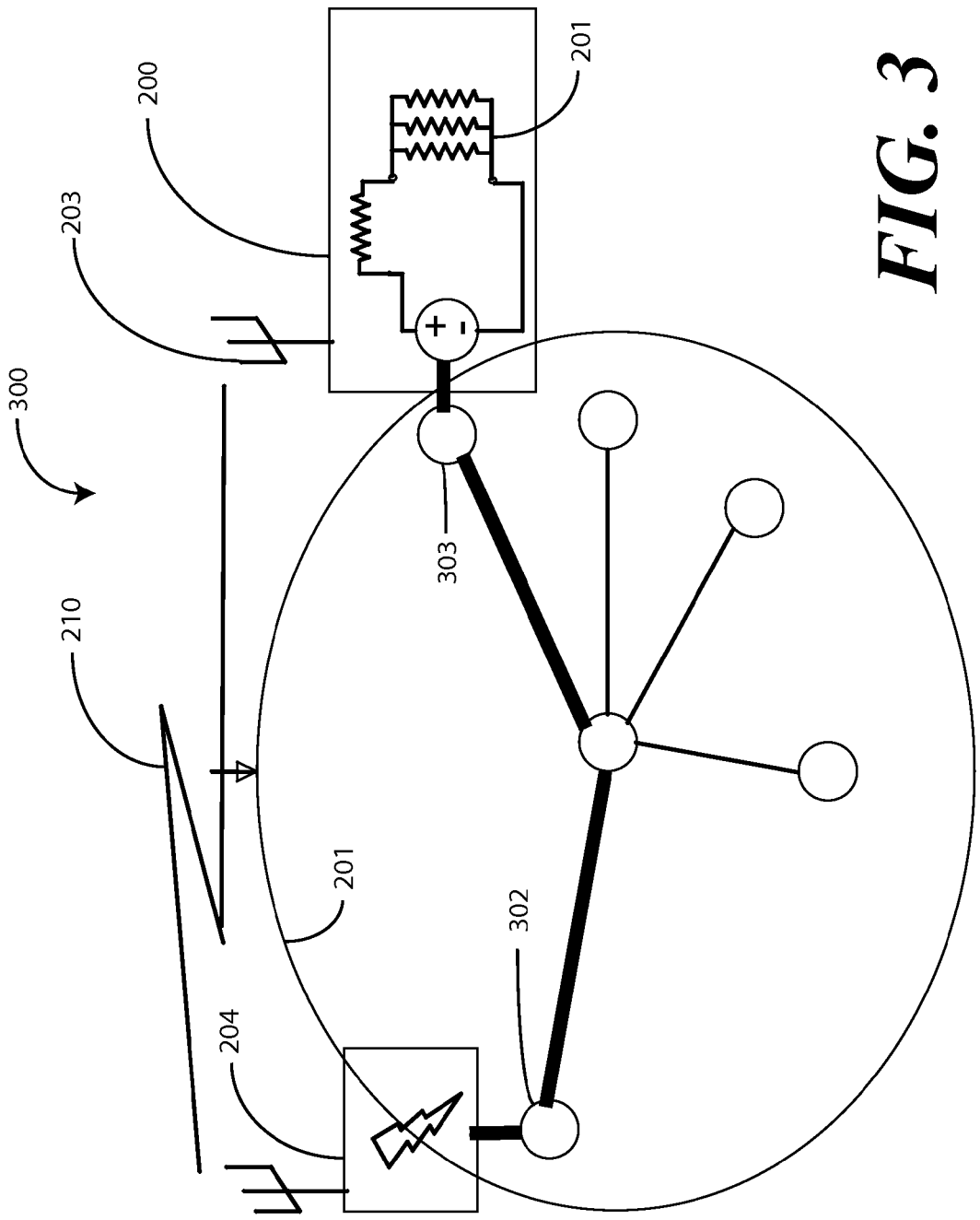
FIG. 3 illustrates an alternate embodiment of a system in accordance with the invention.

Turing to FIG. 3, illustrated therein is one embodiment of a system for controlling power delivery 300 to an electrical load 201. The system for controlling power delivery 300 may comprise a power distribution grid 301 having multiple nodes. The power distribution grid 301 can include any power distribution system and variations to those familiar with the art. In one embodiment, an electrical services provider 204 is coupled to a first node 302 of the power distribution grid 301. The electrical services provider 204 may be capable of generating a communication signal 210 having measurement indicia therein. In one embodiment, the at least one electrical load 201 is coupled to a second node 303 of the power distribution grid 301. A load controlling devices may further be coupled to the second node of the power distribution grid 301.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A method of controlling a local electrical load across a power distribution grid, the method comprising the steps of:
  a. receiving a one-way communication signal from a remote source having measurement indicia therein, the one-way communication signal being generated when line losses of the power distribution grid exceed a predetermined line loss threshold, the measurement indicia comprising an indication to begin a base-line measurement of line voltage;
  b. in response receiving to the one-way communication signal, performing a base-line measurement by measuring the line voltage for at least a predetermined time;
  c. averaging the line voltage across the at least a predetermined time to obtain an average base-line measurement;
  d. retrieving a differential factor from a local memory, wherein the differential factor is received from the remote source by a communication signal;
  e. reducing the average base-line measurement by the differential factor to obtain a threshold value;
  f. monitoring the line voltage; and
  g. upon the line voltage falling below the threshold value, shedding at least one local electrical load.

2. The method of claim 1, wherein the differential factor is at least 0.5 volts.

3. The method of claim 1, wherein the predetermined time is at least 0.1 seconds.

4. The method of claim 1, wherein the receiving the one-way communication signal occurs when another system operating conditions exceed a predetermined threshold of at least one predetermined criterion.

5. The method of claim 4, wherein the at least one predetermined criterion comprises load demand of an electrical distribution network coupled to the local electrical load.

6. The method of claim 4, wherein the at least one predetermined criterion comprises ambient temperature.

7. The method of claim 1, wherein the step of reducing the average base-line measurement by the differential factor comprises multiplying the average base-line measurement by the differential factor.

8. The method of claim 1, wherein the step of reducing the average base-line measurement by the differential factor comprises subtracting the differential factor from the average base-line measurement.

9. The method of claim 1, wherein the step of performing a base-line measurement by measuring the line voltage for at least the predetermined time occurs proximately with the electrical load.

10. The method of claim 1, wherein the step of performing the base-line measurement by measuring the line voltage for at least the predetermined time comprises taking at least five measurements of the line voltage.

11. The method of claim 1, wherein the step of shedding the at least one local electrical load comprises determining a prioritization of a plurality of loads, and removing a load having a highest priority from service.

12. The method of claim 1, further comprising the steps of:
  a. monitoring again the line voltage; and
  b. actuating the at least one electrical load when the line voltage exceeds the threshold value by at least a predetermined restart value.

13. The method of claim 1, further comprising the steps of:
  a. monitoring again the line voltage; and
  b. actuating the at least one electrical load when the line voltage exceeds the threshold value for at least a predetermined restart time.

14. A load controlling device disposed proximately with an electrical load, the load controlling device comprising:
  a. a receiver in communication with an electrical services provider across a distribution grid;
  b. a controller coupled to the transceiver;
  c. a memory coupled to the controller;
  d. a power system characteristic measurement module operable with the controller, the power system characteristic measurement module being configured to establish an averaged base-line measurement of a power system characteristic in response to the receiver receiving a communication signal from the electrical services provider having measurement indicia therein, wherein the power system characteristic comprises voltage, the one-way communication signal being generated when line losses of the power distribution grid exceed a predetermined line loss threshold;
  e. a threshold module operable with the controller, the threshold module being configured to determine a threshold value by retrieving a differential factor from the memory, wherein the differential factor is received from the remote source by a communication signal, and reducing the averaged base-line measurement by the differential factor;
  f. a comparator coupled to the controller, the comparator being configured to monitor the power system characteristic and determine when the power system characteristic falls below the threshold value; and
  g. a load shedding module operable with the comparator, the load shedding module being configured to decouple power to at least one electrical load when the comparator indicates that the power system characteristic falls below the threshold value.

15. The load controlling device of claim 14, further comprising a restart module operable with the comparator, the restart module being configured to recouple power to the at least one electrical load when the comparator indicates that the power system characteristic exceeds the threshold value one of by at least a predetermined amount and for at least a predetermined time.

16. A system for controlling power delivery to an electrical load, the system comprising:
  a. a power distribution grid having multiple nodes;
  b. an electrical services provider coupled to a first node of the power distribution grid, the electrical services provider being capable of generating a one-way communication signal having measurement indicia therein;
  c. at least one electrical load coupled to a second node of the power distribution grid; and
  d. a load controlling device coupled to the second node of the power distribution grid, the load controlling device comprising:
    i. a receiver in communication with an electrical services provider;
    ii. a controller coupled to the transceiver;
    iii. a memory coupled to the controller;
    iv. a power system characteristic measurement module operable with the controller, the power system characteristic measurement module being configured to establish an averaged base-line measurement of a power system characteristic in response to the receiver receiving a communication signal from the electrical services provider having measurement indicia therein, wherein the power system characteristic comprises voltage;
    v. a threshold module operable with the controller, the threshold module being configured to determine a threshold value by retrieving a differential factor from the memory, wherein the differential factor is received from the remote source by a communication signal, and reducing the averaged base-line measurement by the differential factor;
    vi. a comparator coupled to the controller, the comparator being configured to monitor the power system characteristic and determine when the power system characteristic falls below the threshold value; and
    vii. a load shedding module operable with the comparator, the load shedding module being configured to decouple power to at least one electrical load when the comparator indicates that the power system characteristic falls below the threshold value;
  e. wherein the electrical services provider generates the one-way communication signal based upon losses at load of the power distribution grid exceeding a predetermined load loss threshold.

* * * * *